(12) United States Patent
Wang et al.

(10) Patent No.: US 7,643,489 B2
(45) Date of Patent: Jan. 5, 2010

(54) METHODS AND SYSTEMS FOR PROVIDING BANDWIDTH ON DEMAND IN COMMUNICATION SYSTEMS

(75) Inventors: Shaobo Wang, Allen, TX (US); Eric Moritz, Dallas, TX (US); John Spence, Colleyville, TX (US); Anand Ramamurthi, Bangalore (IN); Gongmei Xu, Allen, TX (US)

(73) Assignee: Gigaset Communications Dallas LLC, Dallas, TX (US)

( * ) Notice: Subject to any disclaimer, the term of this patent is extended or adjusted under 35 U.S.C. 154(b) by 1135 days.

(21) Appl. No.: 10/672,771

(22) Filed: Sep. 26, 2003

(65) Prior Publication Data

US 2004/0196848 A1   Oct. 7, 2004

Related U.S. Application Data

(60) Provisional application No. 60/459,685, filed on Apr. 2, 2003.

(51) Int. Cl.
  *H04L 12/28* (2006.01)
(52) U.S. Cl. ................................................ 370/395.2
(58) Field of Classification Search ................. None
  See application file for complete search history.

(56) References Cited

U.S. PATENT DOCUMENTS

| | | | | |
|---|---|---|---|---|
| 5,870,589 | A * | 2/1999 | Alexander et al. | 703/23 |
| 5,946,311 | A * | 8/1999 | Alexander et al. | 370/395.53 |
| 6,032,272 | A * | 2/2000 | Soirinsuo et al. | 714/706 |
| 6,148,337 | A * | 11/2000 | Estberg et al. | 709/224 |
| 6,453,317 | B1 * | 9/2002 | LaCost et al. | 707/10 |
| 6,625,158 | B1 * | 9/2003 | Alexander et al. | 370/398 |
| 6,714,545 | B1 * | 3/2004 | Hugenberg et al. | 370/395.1 |
| 6,788,696 | B2 * | 9/2004 | Allan et al. | 370/411 |
| 6,917,619 | B1 * | 7/2005 | Waldman | 370/401 |
| 7,065,092 | B2 * | 6/2006 | Chen et al. | 370/395.52 |
| 7,106,698 | B1 * | 9/2006 | Basso et al. | 370/232 |
| 7,154,852 | B1 * | 12/2006 | Kalimuthu et al. | 370/232 |
| 7,307,993 | B2 * | 12/2007 | Cunetto et al. | 370/395.2 |
| 7,382,785 | B2 * | 6/2008 | Chen et al. | 370/399 |
| 2002/0024954 | A1 * | 2/2002 | Cunetto et al. | 370/395.2 |
| 2002/0057700 | A1 | 5/2002 | Sreedharan et al. | |
| 2004/0044789 | A1 * | 3/2004 | Angel et al. | 709/238 |

FOREIGN PATENT DOCUMENTS

EP    0 936 833 A2    8/1999

* cited by examiner

*Primary Examiner*—Ayaz R Sheikh
*Assistant Examiner*—Blanche Wong
(74) *Attorney, Agent, or Firm*—Occhiuti Rohlicek & Tsao LLP

(57) ABSTRACT

The improved bandwidth provisioning solution of the present invention enables the provision of bandwidth on demand by dynamically establishing and terminating one or more dynamic virtual circuits (SVCs) (137) to supplement a subscriber's default broadband connection. The improved bandwidth provisioning solution includes a client-side application (107) residing on the subscriber's data processing system (105) and a connection-management application (142) residing on a proxy signaling server (140). The client-side application (107) transmits a subscriber's request for a bandwidth-on-demand session to the connection-management application (142), which communicates with an asynchronous transfer mode (ATM) edge device (120) using User Network Interface (UNI) signaling to initiate the one or more VCs (137). When the subscriber no longer desires the additional bandwidth, the supplemental VCs (137) may be terminated.

18 Claims, 4 Drawing Sheets

METHODS AND SYSTEMS FOR PROVIDING BANDWIDTH ON DEMAND IN COMMUNICATION SYSTEMS

CROSS-REFERENCES TO RELATED APPLICATIONS

This application is entitled to the benefit of Provisional Patent Application Ser. No. 60/459,685, filed on Apr. 2, 2003.

FIELD OF THE INVENTION

The present invention relates to methods and systems for providing bandwidth on demand in communication systems, and more particularly to an improved bandwidth provisioning solution for providing bandwidth on demand in communication systems that include Asynchronous Transfer Mode (ATM) technology.

BACKGROUND

Modern broadband communication systems are called upon to transmit a wide range of data types, from email to real-time video, which have a wide range of bandwidth requirements. Conventional broadband access networks, such as digital subscriber line (DSL) networks, are not well equipped to handle these varying bandwidth requirements. Convention broadband access networks generally place an artificial cap on a subscriber's maximum bandwidth level based on the service level selected by the subscriber. If the subscriber selects a low service level, the price is low, but the bandwidth cap is also low. With a low bandwidth cap, a subscriber may have difficulty accessing bandwidth-intensive services, such as real-time video. On the other hand, if the subscriber selects a service level with a high bandwidth cap, the subscriber will pay a premium for bandwidth that is not always needed. Once a subscriber selects a particular service level, it generally cannot be changed without involving the service provider.

Most modern broadband communication systems include ATM technology, which has advanced mechanisms for dynamically modifying communication connections. ATM technology has been widely deployed in both backbone networks and in access networks. Unfortunately, conventional client-premises equipment (CPE), such as DSL modems, cannot take advantage of ATM's advance mechanisms because they lack User Network Interface (UNI) signaling capability. As a result, conventional broadband connections are relatively static and inflexible.

SUMMARY OF THE INVENTION

With the foregoing in mind, methods and systems consistent with the present invention provide an improved bandwidth-provisioning solution that enables a broadband subscriber to modify their broadband connection "on the fly" by initiating and terminating one or more dynamic virtual circuits (VCs) to supplement their default connection. The improved bandwidth provisioning solution also enables service providers to create new, more equitable billing schemes to charge fees that are based on subscribers' actual bandwidth usage.

In one aspect, the improved bandwidth-provisioning solution includes a client-side application and a connection-management application residing on a proxy signaling server. When a subscriber wants additional bandwidth, the subscriber requests additional bandwidth using the client-side application. In response, the client-side application sends a request for additional bandwidth to the connection-management application on the proxy signaling server. If possible, the connection-management application then initiates one or more dynamic VCs on behalf of the subscriber by signaling to an ATM edge device on behalf of the subscriber.

In another aspect, an initiation of a bandwidth-on-demand session creates one or more switched virtual circuits (SVCs) between the subscriber data processing system and the content-provider data processing system to supplement the bandwidth of the default connection, and the ending of the bandwidth-on-demand session is by terminating the one or more SVCs.

In yet another aspect, a client-side application of a subscriber data processing is for use by a subscriber to request a bandwidth-on-demand session and for transmitting information to a proxy signaling server in response to the request.

BRIEF DESCRIPTION OF THE DRAWINGS

The invention is explained by way of example with reference to the following drawings.

DETAILED DESCRIPTION

Figure 1:
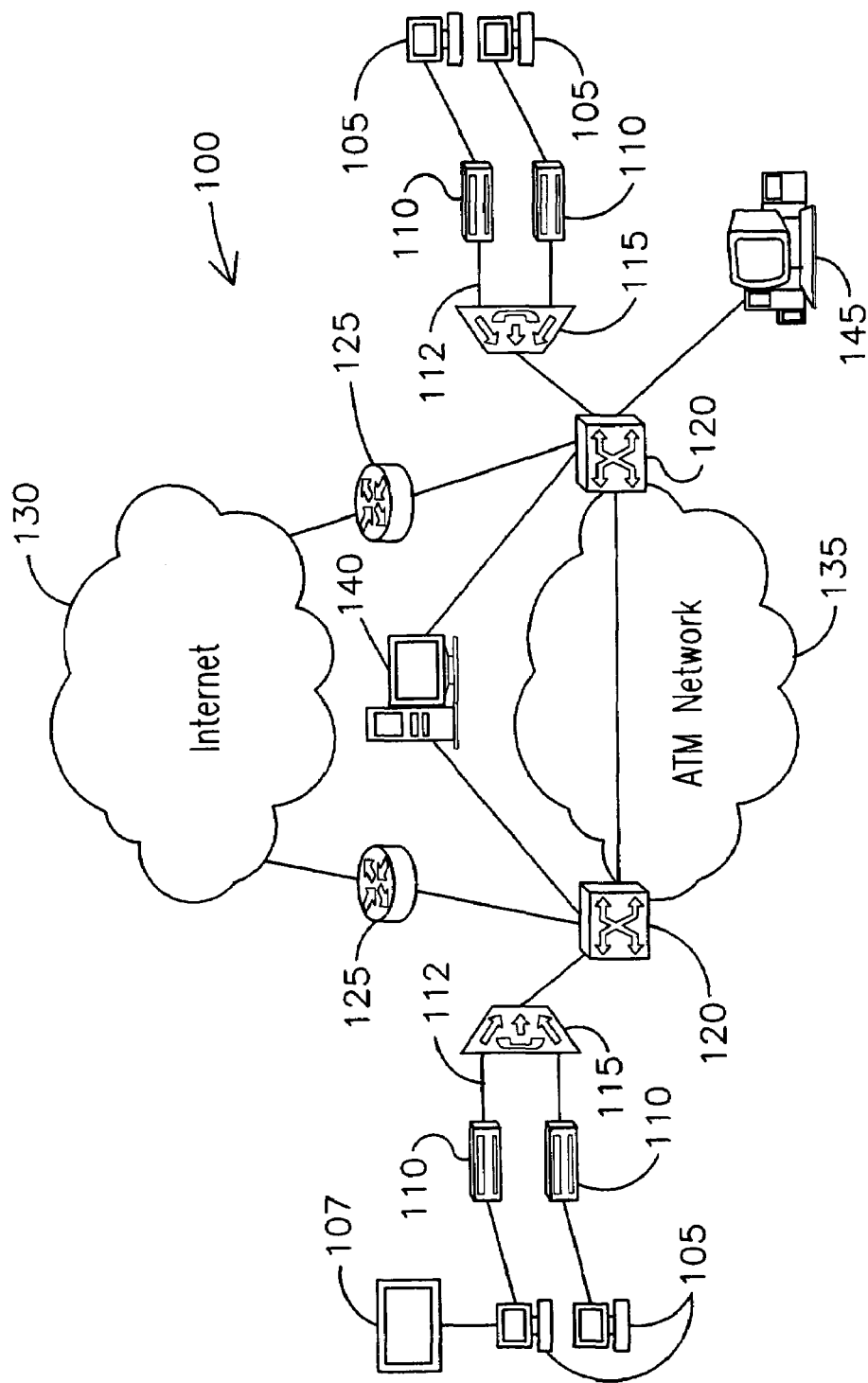
FIG. 1 illustrates a communications system consistent with an exemplary embodiment of the present invention.

FIG. 1 illustrates a broadband communication system 100 that includes the Internet 130 and an ATM network 135. The communication system 100 also includes an improved bandwidth provisioning solution consistent with an exemplary embodiment of the present. The improved bandwidth provisioning solution comprises a client component and a server component.

The Client Component

The client component includes a client-side application 107 residing on a subscriber data processing system 105. The subscriber data processing system 105 provides the subscriber with a point of access to the communication system 100. The subscriber data processing system 105 may be any device capable of transmitting and receiving communication signals over the communication system 100, including but not limited to a personal computer, a handheld device, or a set-top box.

The subscriber data processing system 105 includes a client-side application 107. The client-side application 107 acts as an interface for the subscriber to initiate, modify and release bandwidth-on-demand (BoD) sessions. The client-side application 107 communicates with the proxy signaling server 140 on behalf of the subscriber by using, for example, the Resource Reservation Setup Protocol (RSVP), the Session Initiation Protocol (SIP), ATM signaling and/or user-defined signaling. The client-side application 107 may also act as a controller for a CPE device or an ATM edge device and query the status of such a device, gather statistics from the device, or configure the device.

The client-side application 107 resides on the subscriber data processing system 105 or another device behind the subscriber's CPE. The client-side application 107 may have a textual interface or graphical-user interface (GUI). The GUI may be similar, for example, to an access dialer or a point-to-point over Ethernet (PPPoE) dialer. The client-side application 107 may be a standalone application or may be executed from within another application. For example, the functions of the client-side application 107 may be built into a Web browser or an applet.

The subscriber data processing system 105 is connected to CPE 110. The CPE 110 modulates and demodulates communications traffic for transmission over the telephone company's local-loop telephone line 112 to a DSLAM 115. The CPE 110 may by any hardware and/or software that supports bridge mode. One example of such a device is the SPEED-STREAM™ 5360 residential modem, available from Efficient Networks, Inc., 4849 Alpha Road, Dallas, Tex. 75244. The DSLAM 115, which is typically located in the telephone company's central office or in a remote digital loop carrier, consolidates traffic from multiple DSL lines. The DSLAM 115 passes the traffic on to a backbone network, such as an ATM network 135 illustrated in FIG. 1, for distribution to other networks.

An ATM edge device 120, such as an ATM switch or router, bridges and routes traffic from the DSLAM through the ATM network 135 by setting up and tearing down one or more ATM VCs. A broadband remote access server (BRAS) 115 and Internet 130 provide a default best-effort IP-routed connection from the DSLAM 115 through the ATM edge device 120 to the BRAS 125. A subscriber may establish additional connections from the CPE 110 to the BRAS 115 via the client-side application 107 in order to dynamically allocate bandwidth.

The Server Component

The server component includes a proxy signaling server 140, which resides remotely from the subscriber data processing system 105 and includes a connection-management application 142. The connection-management application 142 includes functionality for initiating, managing and releasing broadband connections for a subscriber. With regard to the improved bandwidth provisioning solution, the connection-management application 142 establishes and releases BoD sessions for a subscriber by setting up and tearing down one or more dynamic VCs. The connection-management application 142 sets up and tears down VCs by communicating with an ATM edge device 120 on behalf of the subscriber, for example, using UNI signaling.

The connection-management application 142 may also perform various billing functions for a service provider. For example, the connection-management application 142 may keep track of the use and duration of BoD sessions and generate billing records related to those sessions. The proxy signaling server 140 may also perform call admission control (CAC) to confirm that a bandwidth level requested by a subscriber is within the physical limitations of a DSL line.

When a subscriber initially establishes a broadband connection, the subscriber is provided a default connection. The default connection between a subscriber data processing system 105 and a content-provider data processing system 145 comprises an ATM permanent virtual circuit (PVC). The default connection is an always-on connection that connects the subscriber's CPE to other elements of the communication system 100. If a subscriber wants to initiate a BoD session, the subscriber directs the client-side application 107 to initiate the session. In response, the client-side application 107 sends a request to the connection-management application 142 residing on the proxy signaling server 140. The connection-management application 142 then communicates on behalf of the subscriber with the ATM edge device 120, or another UNI capable network device, to create one or more dynamic VCs to supplement the subscriber's default connection. Once a BoD session has been initiated, the subscriber may modify or release the session by directing the client-side application 107 accordingly.

BoD Session

Figure 2A:
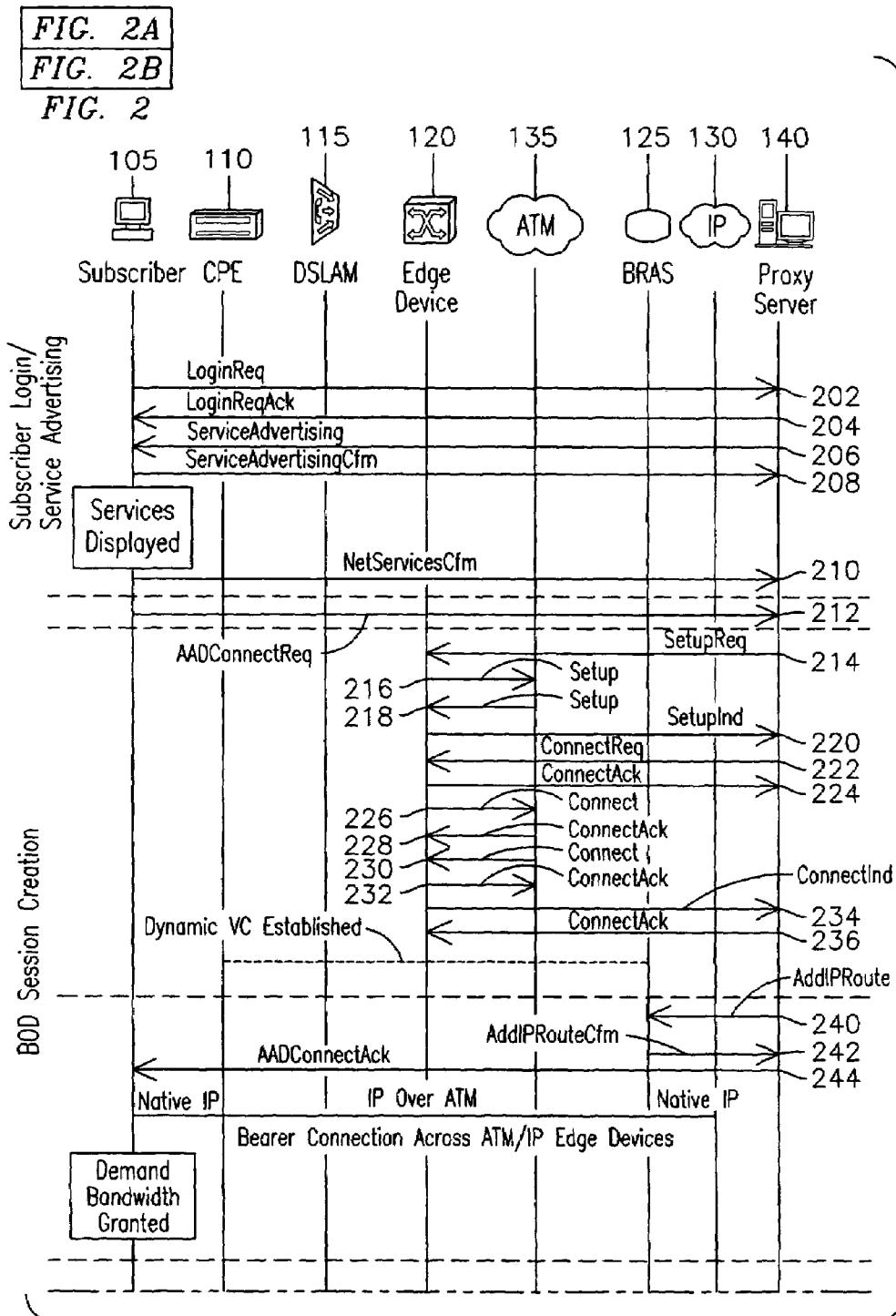
FIGS. 2A-B illustrate sequence diagrams consistent with an exemplary embodiment of the present invention.
Figure 2B:
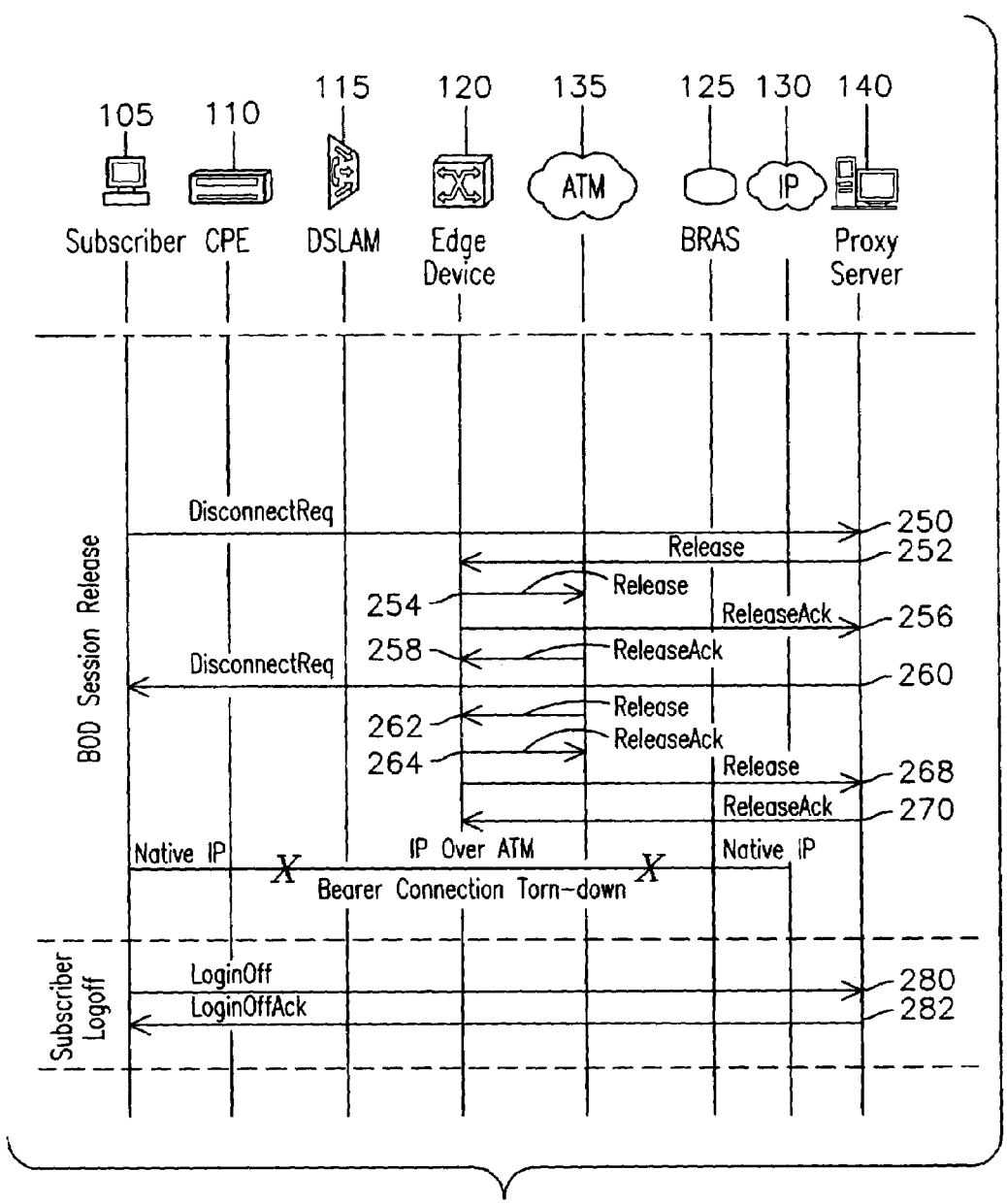
Figure 3:
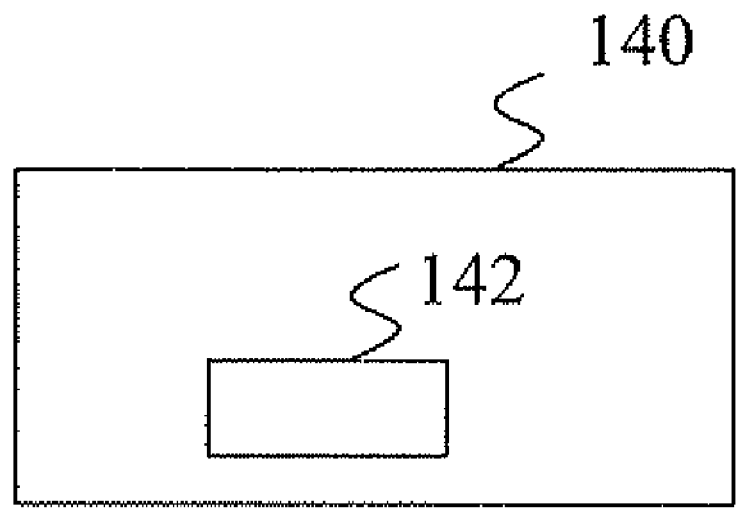
FIG. 3 illustrate a proxy signaling server consistent with an exemplary embodiment of the present invention.

Referring now to FIGS. 2A-B, an exemplary sequence diagram is illustrated, which is consistent with the improved bandwidth provisioning solution of the present invention. The sequence diagram illustrates exemplary signaling messages that may be transmitted during phases of the improved bandwidth provisioning solution. In an exemplary embodiment, the messages transmitted in steps 214 through 236 may be standard UNI signaling messages.

For purposes of illustration, the improved bandwidth provisioning solution is described in terms of four main phases: Subscriber Login/Service Advertising, BoD Session Creation, BoD Session Release, and Subscriber Logoff. During these phases, messages are transmitted and/or received by the actors illustrated at the top of FIGS. 2A-B. The actors include the subscriber 105 (i.e., the subscriber data processing system 105 and/or the client-side application 107), the CPE 110, the ATM edge device 120, the ATM network 135, the BRAS 125, the Internet 130, and the proxy signaling server 140.

The Subscriber Login/Service Advertising phase of the improved bandwidth provisioning comprises steps 202 through 210 in FIG. 2. This phase includes steps associated with the login of a subscriber and with the advertisement of available broadband services. During this phase messages are transmitted between the subscriber 105 and the proxy server 140.

Before initiating a BoD session, the subscriber begins by logging in to the proxy server 140. The client-premises application 107 sends a LoginReq message on behalf of the subscriber to the proxy server 140 (step 202). The LoginReq message may include information such as a customer ID, customer name, device ID, login name, and/or password. If login is possible, the proxy server 140 responds to the LoginReq message with a LoginReqAck message (step 204) containing information such as the name of available broadband services (step 206). Such information may also be sent to the subscriber in a separate Service Advertising message. After the subscriber receives the list of available services, the subscriber data processing system 105 sends a ServiceAdvertisingCfm message to the proxy server 140 to acknowledge receipt of the ServiceAdvertise message (step 208). After the list of available services has been displayed to the subscriber, a NetServicesCfm message is sent to the proxy server as confirmation (step 210), which completes the Subscriber Login/Service Advertising phase.

The BoD Session Creation phase of the improved bandwidth provisioning solution comprises steps 212 through 244 in FIG. 2. This phase involves the establishment of a BoD session for the subscriber over one or more dynamic VCs. During this phase, messages are transmitted and received between the subscriber 105, the proxy server 140, the ATM edge device 120, the ATM network 135, and the BRAS 125.

When a subscriber wants to initiate a BoD session, the subscriber directs the client-side application 107 to initiate the session. In response, the client-side application 107 sends a ConnectReq message to the proxy server 140 requesting the establishment of a BoD session (step 212). The ConnectReq message may contain information such as a device ID for the subscriber, a service name, and/or a requested bandwidth level. Each broadband service has an ATM endpoint address and ATM traffic descriptor associated with it. The proxy server 140 may use the service name transmitted from the subscriber to retrieve the ATM endpoint address and ATM traffic descriptor for a particular service.

The proxy server 140 validates the BoD request from the client-side application 107 based on the device ID and password and saves the incoming IP address and port number. After the request is validated, the proxy signaling server 140 transmits a SetupReq message to the ATM edge device 120 to initiate a dynamic VC between the CPE 110 and a BRAS 125 that is offering the broadband service (step 214). The ATM edge device 120 then communicates with the ATM network 135 using standard ATM Network-to-Network Interface (NNI) Setup messages to set up the BoD session (steps 216 & 218). After transmission of the setup messages, the ATM edge device 120 sends a SetupInd message to the proxy server 140 (step 220). The proxy signaling server 140 then sends a ConnectReq message to the ATM edge device 120 (step 222). In response, the ATM edge device 120 sends a ConnectAck message to the proxy server 140 (step 224). The ATM edge device 120 then communicates with the ATM network 135 using, for example, standard NNI Connect and Connect Acknowledge messages (steps 226-232). Finally, the ATM edge device 120 sends a ConnectInd message to the proxy server 140 (step 234) and the proxy server 140 replies with a ConnectAck message (step 236). At this point a dynamic VC, such as an SVC, has been established between the CPE 110 and the BRAS 125.

Following the establishment of the dynamic VC, the proxy server 140 updates the subscriber's route table to route traffic over the newly created dynamic VC. The proxy server 140 sends an AddIPRoute message to the BRAS 125 to facilitate the routing of traffic over the newly created dynamic VC (step 240). In response, the BRAS 125 sends an AddIPRouteCfm message back to the proxy server 140 (step 242). The proxy server 140 then sends an AddConnectAck message to the client-side application, where the newly created path is presented as available (step 244). Steps 212 through 244 may be repeated to create additional supplemental VCs in order to accommodate a subscriber's bandwidth request.

The BoD Session Release phase comprises steps 250 through 270 in FIG. 2B. When the subscriber no longer wants the additional bandwidth provided by a BoD session, the subscriber may release the BoD session and its associated dynamic VC. After the VC is released, the client-side application 105, CPE 110, and/or BRAS 125 adjust the relevant routing tables to redirect traffic to the subscriber's default PVC connection.

When a subscriber want to release a BoD session, the subscriber starts by directing the client-side application to release the session. In response, the client-side application sends a DisconnectReq message to the proxy server 140 (step 250). The DisconnectReq message may contain information such as virtual path indicator/virtual channel indicator (VPI/VCI), user ID, and cause code. The proxy server 140 responds by sending a Release message to the ATM edge device 120 (step 252). The ATM edge device 120 then communicates with the ATM network 135 (step 254) and the proxy server 140 (step 256) to release the dynamic VC. After the dynamic VC is released, the ATM network 135 sends a message to the ATM edge device 120 acknowledging the release (step 258). The proxy server 140 then sends a DisconnectReq message to the subscriber to request the release of the active connection (step 260). The ATM network 135 then sends a Release message to the ATM edge device 120 and the ATM edge device 120 responds with a ReleaseAck message (step 264). The ATM edge device 120 then sends a release message to the proxy server 140 (step 2698) and the proxy server 140 responds with a ReleaseAck message (step 270) releasing the BoD session connection.

Steps 280 through 282 relate to the Subscriber Logoff phase. When the subscriber wants to log off from a BoD session, the subscriber directs the client-side application to log off. In response, the client-side application sends a LoginOff message containing a User ID to the proxy server 140 (step 280) and the proxy server 140 responds with a LoginOffAck message confirming the log off (step 282), ending the BoD session.

The present invention has been described with reference to the accompanying drawings that illustrate a preferred embodiment of the invention. The invention may, however, be embodied in many different forms and should not be construed as limited to the embodiment set forth herein. For example, in larger networks, the improved bandwidth provisioning solution may include multiple proxy signaling servers. The connection-management application may initiate and terminate dynamic VCs by signaling to the ATM edge device or to a UNI-capable DSLAM. The dynamic VCs discussed in connection with the present invention may be initiated and released in response a variety of different triggers, including but not limited to the direction of a subscriber interacting with the client-side application, the direction of an administrator using the connection-management application, or a variety of automatic triggers, such as the time of day or the type of application or broadband service being used by the subscriber.

What is claimed is:

1. A method of providing bandwidth on demand in a broadband communications system, comprising:
    establishing a default connection between a subscriber data processing system connected to a client-premises equipment (CPE) and a content-provider data processing system, said default connection comprising an asynchronous transfer mode (ATM) permanent virtual circuit (PVC);
    initiating a bandwidth-on-demand session via a subscriber, said bandwidth-on-demand session creates one or more switched virtual circuits (SVCs) between said subscriber data processing system and said content-provider data processing system to supplement the bandwidth of said default connection; and
    ending said bandwidth-on-demand session by terminating said one or more SVCs,
    wherein said step of initiating a bandwidth-on-demand session comprises sending a message from said subscriber data processing system to a proxy signaling server comprising information related to said bandwidth-on-demand session and, in response to said message, sending a message from said proxy signaling server to an ATM edge device to create one or more SVCs between said subscriber data processing system and said content-provider data processing system, wherein said message from said subscriber data processing system to said proxy signaling server does not comprise User Network Interface (UNI) signals and wherein said message from said proxy signaling server to said ATM edge device comprises UNI signals.

2. The method of claim 1 wherein said information comprises data for authenticating said subscriber.

3. The method of claim 1 wherein said step of ending said bandwidth-on-demand session comprises sending a message from said subscriber data processing system to a proxy signaling server comprising an instruction to end said bandwidth-on-demand session and, in response to said message, sending a message from said proxy signaling server to an ATM edge device to terminate said one or more SVCs between said subscriber data processing system and said content-provider data processing system.

4. The method of claim 1 wherein said ATM edge device comprises an ATM switch.

5. The method of claim 4 wherein said step of initiating a bandwidth-on-demand session comprises said subscriber using a client-side application on said subscriber data processing system to request said bandwidth-on-demand session.

6. The method of claim 1, further comprising:
   logging onto to a proxy signaling server via a subscriber of said subscriber data processing system; and
   providing service advertising information to said subscriber from the proxy signaling server in response to a successful login,
   wherein initiating said bandwidth-on-demand session is after said providing of said service advertising information.

7. The method of claim 6, further comprising updating a route table of said subscriber data processing system via the proxy signaling server in response to said creation of said one or more SVCs and in order to route traffic over the newly created said one or more SVCs.

8. The method of claim 1, wherein said ending of said bandwidth-on-demand session is by said subscriber.

9. A broadband communication system for providing bandwidth-on-demand, comprising:
   a subscriber data processing system for providing a subscriber with access to said communication system;
   client premises equipment (CPE) in communication with the subscriber data processing system for modulating and demodulating data for transmission over a local loop telephone line to a digital subscriber line (DSL) multiplexer (DSLAM);
   an asynchronous transfer mode (ATM) edge device in communication with said DSLAM for receiving data from and transmitting data over an ATM network;
   a proxy signaling server in communication with said subscriber data processing system;
   a content-provider data processing system in communication with said ATM network for providing broadband content to a subscriber;
   a client-side application on said subscriber data processing system for use by said subscriber:
      to login to said proxy signaling server,
      to receive service advertising information from said proxy signaling server due to said login,
      to request a bandwidth-on-demand session after said receive, and
      to transmit information to said proxy signaling server in response to said request; and
   a connection-management application on said proxy signaling server for:
      providing service advertising information to said client-side application due to said login,
      receiving said information from the client-side application, and
      signaling to said ATM edge device on behalf of said client-premises equipment (CPE) to establish one or more switched virtual circuits (SVCs) from said CPE to said content-provider data processing system.

10. The system of claim 9 wherein said CPE supports a bridge mode.

11. The system of claim 10 wherein said proxy signaling server uses User Network Interface (UNI) signaling to signal said ATM switch on behalf of said CPE.

12. The system of claim 11 wherein said client-side application comprises a web browser plug-in.

13. The system of claim 11 wherein said client-side application comprises a dialer application.

14. The system of claim 11 wherein said ATM edge device comprises an ATM switch.

15. The system of claim 9, wherein said login includes a message comprising a password and customer identifier.

16. The system of claim 9, wherein a termination of said created one or more SVCs is initiated via said client-side application.

17. The system of claim 16, wherein a logoff from said proxy signaling server via said client-side application occurs after said termination of one or more SVCs.

18. A communications system, comprising:
   a subscriber data processing system for use by a subscriber to transmit and receive data to and from a remote content-provider data processing system;
   client premise equipment (CPE) in communication with said subscriber data processing system for transmitting and receiving said data over a local loop to a DSL multiplexer (DSLAM);
   an asynchronous transfer mode (ATM) edge device in communication with said DSLAM for transmitting and receiving said data over an ATM network;
   a proxy signaling server in communication with said subscriber data processing system and said ATM edge device;
   means in said subscriber data processing system, responsive to said subscriber, to send a request to said proxy signaling server to login to said proxy signaling server, to receive service advertising data from said proxy signaling server due to said login, to initiate a bandwidth-on-demand session after said receive, to terminate said bandwidth-on-demand session, and to logoff from said proxy signaling server after said termination; and
   means in said proxy signaling server, responsive to said requests, wherein said initiating said bandwidth-on-demand session initiated by said means in said subscriber data system creates one or more Switched Virtual Circuits (SVCs) between said subscriber data processing system and said content-provider data processing system.

* * * * *